United States Patent [19]

Lazarek

[11] 3,753,458

[45] Aug. 21, 1973

[54] DEMOUNTABLE CAR WINDOW SCREEN AND FASTENING MEANS THEREFOR

[76] Inventor: Andrew H. Lazarek, 2319 Arnold Ave., Yorkville, N.Y. 13495

[22] Filed: Apr. 12, 1972

[21] Appl. No.: 243,363

[52] U.S. Cl............. 160/354, 160/368, 160/DIG. 2
[51] Int. Cl.............................................. A47h 3/00
[58] Field of Search...................... 160/354, DIG. 2, 160/368; 24/204, 205.12, 215, 206

[56] References Cited
UNITED STATES PATENTS

| | | | |
|---|---|---|---|
| 2,487,830 | 11/1949 | Robbins | 160/237 UX |
| 3,048,910 | 8/1962 | Sturtevant | 24/215 |
| 2,709,290 | 5/1955 | Rosenthal | 24/204 |
| 3,679,505 | 7/1972 | Hinderaker et al. | 160/354 |

FOREIGN PATENTS OR APPLICATIONS 748,666   12/1966   Canada.............................. 160/354

1,273,849   9/1961   France................................ 160/354

*Primary Examiner*—Mervin Stein
*Assistant Examiner*—Philip C. Kannan
*Attorney*—Raymond J. Eifler

[57] ABSTRACT

A demountable screen for a car window which comprises a sheet of screening somewhat larger than the car window cut to the configuration of the car window; and a strip of male and female Velcro, one strip of which is mounted around the car window and the other strip is mounted to the screen around the periphery thereof so that the screen may be demountably attached to the window. In an alternate embodiment a strip of material having projections thereon that mate with the apertures in the screen is mounted around the window so that the screen may be placed over the window and against the projection, thereby demountably attaching the screen to the car window.

1 Claim, 5 Drawing Figures

PATENTED AUG 21 1973 3,753,458

DEMOUNTABLE CAR WINDOW SCREEN AND FASTENING MEANS THEREFOR

BACKGROUND OF THE INVENTION

This invention relates to a method and apparatus for demountably attaching a screen to a car window. The invention is also related to a fastener that includes as one of the fastening elements a piece of screening or mesh.

It is unfortunate that the summer months of the year are both the most desirable for the use of automobiles and the most undesirable from the point of view of insect and bug annoyances. Almost every automobile owner has experienced the annoyance of mosquitoes and other insects while enjoying an outdoor movie, eating a sandwich at a drive-in, or camping out. Many sportsmen like to use their automobiles to sleep in while on sporting expeditions, and they too experience the annoyance of insects or are forced to remain in the automobile with the windows closed. Permanently attached screens to the automobile windows are undesirable in that they impair visibility and are probably not necessary in view of the fact that insect annoyance is a serious problem only when the automobile is parked, because when the vehicle is moving the rush of air past the vehicle is sufficient to prevent insects from entering a moving automobile.

SUMMARY OF THE INVENTION

This invention provides a screen for an automobile window that is demountably attached on the inside thereof by novel mounting means.

The invention is a demountable screen for a car window that is characterized by a mounting means that includes a plurality of projections thereon that are operable to pass through the apertures in the screen and retain the screen in a fixed position with respect to the mounting means until a removal force is applied. The projections on the mounting means are further characterized by their shape, which may be hook-like or loop-like projections that are resiliently deformed when they pass through the apertures in the screen.

In one embodiment of the invention the demountable screen for a car window comprises: a sheet of screening material somewhat larger than the window; a first strip of material having a plurality of resilient loop-like projections projecting from the surface of one face of the strip, the opposite side of the strip attached around the window; and a second strip of material having a plurality of resilient hook-like projections projecting from the surface of one face of the second strip, the hook-like projections adapted to link with the loop-like projections of the first strip of material when the first and second strips are placed in face-to-face pressurized contact with each other, the opposite side of the second strip attached to the screening to form a configuration that matches the configuration of the first strip of material mounted around the window whereby when the first and second strips are mated in face-to-face contact with each other, the screening is demountably attached over the car window by the linking action of hook-like least some of the resilient ho-like and loop-like projections on the strips.

In another embodiment of the invention the two-piece fastener that is repeatably disconnectable comprises: a first piece of screening having a plurality of apertures, each of the apertures having a distance $D_1$ between two opposite points on the periphery of the aperture; and a second piece that disconnectably connects to the first piece and holds the first and second pieces together after said first and second pieces have been placed in pressurized contact with each other, the second piece including a substrate and a plurality of resiliently deformable projections extending therefrom, each of the projections including a portion that extends a distance $D_2$ in a direction transverse to the general direction of the projections, the distance $D_2$ being greater than $D_1$, so that when said first and second pieces are placed in pressurized contact, the resiliently deformable projections are deformed in a manner that permits the projections to pass through the apertures ($D_2$ deformed smaller than $D_1$) and return to their original shape after passage through the apertures, whereby when said pressure is removed from said pieces, said first and second pieces remain connected together by the engagement of said projections with said screening.

Accordingly, it is an object of this invention to provide a screen for a car window that may be demountably installed without the use of tools, without defacing the window frame, which is neat and inconspicuous in appearance, which may be stored in a minimum of space when not in use, and which does not interfere with the normal operation of the automobile window.

It is a further object of this invention to provide an insect screen for use on an automobile window which is easily fabricated and inexpensive.

It is another object of this invention to provide a novel fastening means, one portion of which is comprised of inexpensive mesh or screening.

The above and other objects and features of the invention will become apparent from the following detailed description taken in conjunction with the accompanying drawings and claims which form a part of this specification.

DETAILED DESCRIPTION OF THE DRAWINGS

Figure 1:
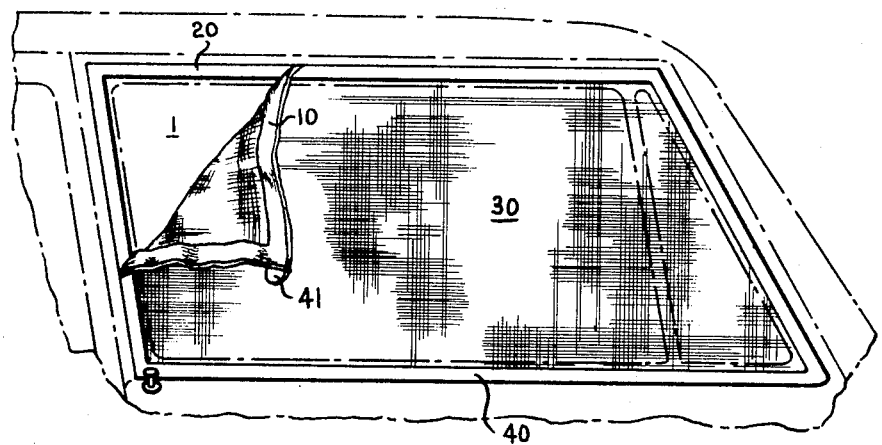
FIG. 1 illustrates a screen demountably attached to a car window that utilizes the principles of this invention.

Referring now to the drawings, FIG. 1 illustrates a screen 30 which is demountably attached around a car window 1 so that when the car window is lowered and the screen 30 is in place, insects are prevented from entering the vehicle. The method and apparatus for demountably attaching the screen 30 to the window include a male and female strip of Velcro tape which may be obtained from The Hartwell Corporation, 9035 Venice Boulevard, Los Angeles, Calif. 90034. The first strip 10 attached to the screen 30 is the male portion of the Velcro tape having a plurality of nylon hooks thereon. The tape is attached to screen 30 by a permanent adhesive or the like. An example of a permanent adhesive is Permabond supplied by Techni-Tool Inc. of 1216 Arch Street, Philadelphia, Pa. 19107. Similarly, the female strip of Velcro tape 20, which is a pile tape of 100 percent Nomex, is attached around the car window by adhesive. If it is desirable to give additional support to the screening 30 and thereby maintain its shape when it is removed from the window, a strip of canvas belting 40 may be arranged around the periphery of the screening 30 on the opposite side of the Velcro tape 10. Further, to assist in the removal of the screen from the window, the canvas belting may extend beyond the periphery of the screen to form a tab 41. Therefore, once the screen is completely in place, tab 41 may then be pulled to remove the screen 30 from the window 1. Obviously, the strip 20 and strip 10 on the screen 30 must be identical in configuration and size so that they may engage each other at all points around the window 1.

The overall dimensions and contour of the screen 30 will of course vary in accordance with the shape and size of the windows of various automobile models. However, the inventor suggests that the size of the screen 30 having a height of 17 inches and a length of 38 inches will satisfactorily fit most of the American-made automobiles, particularly the popular models. For automobiles with windows which differ greatly from the customary dimensions, the invention may be practiced by cutting a screen to the shape of the car window but somewhat larger than the window. The screen 30 without the canvas tape 40 is easily rolled and/or folded so that it may be placed in the glove compartment or other convenient place within the automobile for later use.

Figure 2:
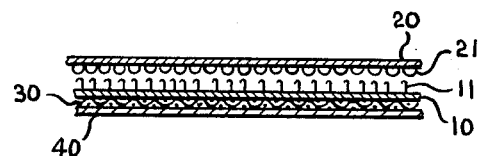
FIG. 2 is a diagrammatic partial cross-sectional diagram of the screen and the mounting means.

FIG. 2 is a partial diagrammatic cross-sectional diagram showing the screening 30 having the canvas belting 40 attached to one side thereof and the male Velcro tape 10, which has a plurality of hook-like resilient projections 11 that co-act with the loops 21 of the female portion of the Velcro tape 20, attached to the other side thereof. When pressed together the hook-like projections 11 resiliently deform to link or engage the loops 21. Applying an opposite force causes the hooks 11 to deform and release their holds on the loops 21, allowing the screen to separate from the tape 20.

Figure 3:
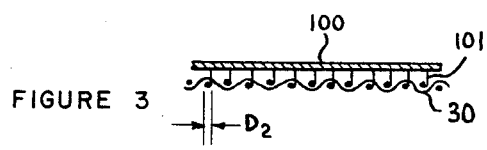
FIG. 3 illustrates how a screen is mounted with a single mounting strip having a plurality of hook-like projections.

FIG. 3 illustrates an alternate novel approach to mounting the screen 30 which utilizes only one strip of material that mates with the screen. The strip of material that mates with the screen 30 includes a substrate 100 that has a plurality of resilietly deformable hook-like projections 101 that engage the peripheral edges of the apertures in the screen 30. Each of the resiliently deformable hook-like projections 101 extends a distance $D_2$ in a direction transverse to the general direction of the projections from said substrate, the distance $D_2$ being greater than the distance $D_1$ which is the distance between two opposite points on the periphery of an aperture of the screening 30. Therefore, when the screening 30 is pressed into contact with the resiliently deformable projections, the hook-like portions of the projections are deformed in a manner that permits the projections to pass through the aperture of the screen 30 and return to their original shape after passage through the apertures whereby when pressure is removed from the screening 30, the screening 30 remains connected to the substrate 100 by the engagement or linking of the projections with the screening. Alternately, the screening 30 may be supported by a substrate, being spaced therefrom by strips and/or pieces so that the screening is not flush against the substrate whereby the apertures in the screen may receive the resiliently deformable projections. As a second alternate the screening could be folded one or more times so that one side receives adhesive and the other side receives the resiliently deformable projections.

Figure 4:
FIG. 4 illustrates how a screen is attached to a strip having a plurality of loop-like projections.

FIG. 4 functions similarly to the structure shown in FIG. 3 except that the projections 102 are loop-shaped, one end of the loop being attached to the substrate 100 and the other end of the loop having a configuration that is conducive to and/or facilitates the radial constriction of the loops, which after passage through an aperture in said screening 30 resumes its original shape due to its resilient nature. Each of the loops 102 is comprised of a resiliently deformable material such as strands of nylon, plastic, wire or like material, including materials presently used for making the hooks and loops of the Velcro tape. Each of the loops further includes a shape having an axial length and a radial length, the radial length being defined as the distance between two opposite points on the loop that form a line transverse to the axial length of the loop. The maximum radial width of the loop is defined by the radial distance $D_2$ between opposite sides of the loop.

Figure 5:
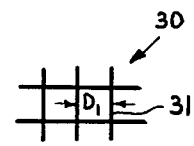
FIG. 5 is a plan view of one aperture in the screening shown in FIGS. 1 through 4.

FIG. 5 illustrates one aperture 31 in the screening 30. The distance $D_1$ between any two opposite points around the periphery of the aperture is illustrated, the aperture in the screen being smaller than most insects and generally smaller than about 1/16 inch square. As can be seen from FIGS. 3, 4 and 5, when the distance $D_2$ of the projections 101,102 is greater than the distance $D_1$, the resiliently deformable projections will be deformed when pressed against the screen, pass through the aperture 31, return to their original shape and thereby engage the screening so that it is demountably attached to the substrate 100.

While a preferred embodiment of the invention has been disclosed, it will be apparent to those skilled in the art that changes may be made to the invention as set forth in the claims and, in some cases, certain features of the invention may be used to advantage without corresponding use of other features. For example, the screening material could be comprised of a resiliently deformable material, while the projections 101, 102 could be comprised of a fairly rigid material. Further, the projections 102 could be spaced apart one from the other a distance which is slightly larger than the distance between the two succeeding opposite points on a resiliently deformable aperture. Accordingly, it is intended that the illustrative and descriptive material herein be used to illustrate the principles of the invention and not to limit the scope thereof.

Having described the invention, what is claimed is:

1. A demountable screen for a window, said screen comprising:

a sheet of screening somewhat larger than said window, said screening having a plurality of apertures; and mounting means including a strip of material having a hundreds of hook-like projections that are operable to pass through the apertures in said screen and hook onto a portion of said screen when said strip of material is placed in pressurized contact with said screen, said hook-like projections being resiliently deformable so that said screen may be repeatedly engaged and disengaged from said mounting means, said mounting means attached around said window whereby said screen may be demountably attached around said window.

* * * * *